(12) United States Patent
Raj et al.

(10) Patent No.: US 11,560,913 B2
(45) Date of Patent: Jan. 24, 2023

(54) BRAZED JOINT AND SEMICONDUCTOR PROCESSING CHAMBER COMPONENT HAVING THE SAME

(71) Applicant: Applied Materials, Inc., Santa Clara, CA (US)

(72) Inventors: Govinda Raj, Santa Clara, CA (US); Tom K. Cho, Los Altos, CA (US); Hamid Mohiuddin, Campbell, CA (US); Ian Widlow, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1045 days.

(21) Appl. No.: 16/249,731

(22) Filed: Jan. 16, 2019

(65) Prior Publication Data
US 2019/0226512 A1 Jul. 25, 2019

Related U.S. Application Data

(60) Provisional application No. 62/619,338, filed on Jan. 19, 2018, provisional application No. 62/702,720, filed on Jul. 24, 2018.

(51) Int. Cl.
*B23K 1/00* (2006.01)
*F16B 5/08* (2006.01)
(Continued)

(52) U.S. Cl.
CPC .............. *F16B 5/08* (2013.01); *B23K 1/0016* (2013.01); *B23K 1/206* (2013.01); *C04B 37/023* (2013.01);
(Continued)

(58) Field of Classification Search
CPC ......... F16B 5/08; B23K 1/0016; B23K 1/206; B23K 2101/40; B23K 2103/52; B23K 2103/172; B23K 1/19; B23K 20/002; B23K 35/0238; C04B 37/023; C04B 37/026; C04B 2235/5216; C04B 2235/5256;
(Continued)

(56) References Cited

U.S. PATENT DOCUMENTS 3,105,293 A * 10/1963 Skinner .................... B23K 1/19
428/939
3,302,961 A * 2/1967 Sidney ................. H01B 17/305
16/DIG. 30

(Continued)

FOREIGN PATENT DOCUMENTS

GB 1471438 A * 4/1977 ........... C04B 37/026
JP 2018012116 A * 1/2018 ............... B23K 1/14

OTHER PUBLICATIONS

Taiwan Office Action dated Aug. 30, 2019 for Application No. 108101924.

*Primary Examiner* — Kiley S Stoner
(74) *Attorney, Agent, or Firm* — Patterson + Sheridan, LLP (57) ABSTRACT

Methods of forming a metallic-ceramic brazed joint are disclosed herein. The method of forming the brazed joint includes deoxidizing the surface of metallic components, assembling the joint, heating the joint to fuse the joint components, and cooling the joint. In certain embodiments, the brazed joint includes a conformal layer. In further embodiments, the brazed joint has features in order to reduce stress concentrations within the joint.

15 Claims, 7 Drawing Sheets

(51) Int. Cl.
*B23K 1/20* (2006.01)
*C04B 37/02* (2006.01)
*B23K 101/40* (2006.01)
*B23K 103/00* (2006.01)
*B23K 103/16* (2006.01)

(52) U.S. Cl.
CPC ........ *C04B 37/026* (2013.01); *B23K 2101/40* (2018.08); *B23K 2103/172* (2018.08); *B23K 2103/52* (2018.08); *C04B 2235/5216* (2013.01); *C04B 2235/5256* (2013.01); *C04B 2237/122* (2013.01); *C04B 2237/123* (2013.01); *C04B 2237/124* (2013.01); *C04B 2237/125* (2013.01); *C04B 2237/343* (2013.01); *C04B 2237/366* (2013.01); *C04B 2237/403* (2013.01); *C04B 2237/405* (2013.01); *C04B 2237/406* (2013.01); *C04B 2237/52* (2013.01); *C04B 2237/595* (2013.01); *C04B 2237/72* (2013.01); *C04B 2237/74* (2013.01); *C04B 2237/76* (2013.01); *C04B 2237/84* (2013.01)

(58) Field of Classification Search
CPC ........ C04B 2237/122; C04B 2237/123; C04B 2237/124; C04B 2237/125; C04B 2237/343; C04B 2237/366; C04B 2237/403; C04B 2237/405; C04B 2237/406; C04B 2237/52; C04B 2237/595; C04B 2237/72; C04B 2237/74; C04B 2237/76; C04B 2237/84; C23C 14/00; C23C 16/00; H01L 21/67011; H01L 21/02
USPC ........... 228/245–262, 165, 174, 122.1–124.7
See application file for complete search history.

(56) References Cited

U.S. PATENT DOCUMENTS

| | | | | |
|---|---|---|---|---|
| 3,382,052 A | * | 5/1968 | Clarke | B23K 35/001 428/673 |
| 3,385,618 A | * | 5/1968 | Hargis | C04B 37/026 313/317 |
| 3,438,770 A | | 4/1969 | Clark et al. | |
| 4,136,813 A | * | 1/1979 | Smith | B23K 1/203 228/234.1 |
| 4,335,998 A | | 6/1982 | Siebels | F01D 5/025 228/234.1 |
| 4,747,722 A | * | 5/1988 | Kawaguchi | F02F 7/0087 403/30 |
| 4,984,927 A | * | 1/1991 | Kojima | C04B 37/026 403/30 |
| 4,995,547 A | * | 2/1991 | Schubert | C04B 37/026 228/217 |
| 5,511,799 A | | 4/1996 | Davenport et al. | |
| 5,735,339 A | | 4/1998 | Davenport et al. | |
| 6,035,101 A | | 3/2000 | Sajoto et al. | |
| 6,179,631 B1 | * | 1/2001 | Downes | H05K 3/3447 228/56.3 |
| 6,490,144 B1 | | 12/2002 | Narendrnath et al. | |
| 6,490,146 B2 | | 12/2002 | Wang et al. | |
| 2005/0247762 A1 | * | 11/2005 | Breznak | B23K 1/0018 228/245 |
| 2007/0221662 A1 | | 9/2007 | Nishioka | |
| 2013/0062398 A1 | * | 3/2013 | Wang | B23K 1/0016 228/203 |
| 2014/0272457 A1 | * | 9/2014 | Watada | A61N 1/3754 428/450 |
| 2014/0356701 A1 | * | 12/2014 | Gong | H01M 50/183 429/185 |
| 2017/0069520 A1 | | 3/2017 | Unno | |
| 2018/0197661 A1 | * | 7/2018 | Seitz | B23K 1/008 |

* cited by examiner

BRAZED JOINT AND SEMICONDUCTOR PROCESSING CHAMBER COMPONENT HAVING THE SAME

CROSS-REFERENCE TO RELATED APPLICATIONS

This application claims benefits of U.S. Provisional Patent Applications Nos. 62/619,338, filed Jan. 19, 2018, and 62/702,720, filed Jul. 24, 2018, both of which are herein incorporated in their entirety.

BACKGROUND

Field

Embodiments of the present disclosure generally relate to brazed joints for use in semiconductor processing chamber components.

Description of the Related Art

The demand for electronic devices, such as semiconductors, continues to push manufacturing processes to improve. For example, the reliability and useable life of components used within manufacturing chambers are challenged to increase in order to reduce maintenance outages and increase utilization of the processing chambers.

Brazed joints are commonly found in processing chamber components used in semiconductor processing chambers for electronics manufacturing. Brazed joints in semiconductor manufacturing processes, such as chemical vapor deposition (CVD), physical vapor deposition or etching processes, require frequent maintenance in order to maintain operability of the semiconductor processing chamber. As the demand for increased life of processing chamber components continues to grow, brazed joints need to improve to reduce the maintenance due to component failures.

Therefore, there is a need for brazed joints with less component failures.

SUMMARY

The present disclosure generally relates to brazed joints for use in semiconductor manufacturing and semiconductor processing components. In one aspect, a brazed joint includes features on one or more components of the brazed joint to reduce stresses therein. In another aspect, a brazed joint is formed using a multilayer construction. The multilayer construction includes a mesh, an insert, and a brazing material. The brazed joint optionally includes a conformal layer formed from chromium, tungsten, titanium, or nitrides thereof. In another aspect, a method of forming a brazed joint includes deoxidizing components thereof, assembling the joint, heating the joint to fuse the material, and cooling the joint. A controlled force is applied to the joint to prevent introducing excess stress into the joint during heating.

In one embodiment, a method of creating a brazed joint includes deoxidizing the surfaces of a metallic joint component. The metallic joint component and a brazing material are disposed within a recess in a ceramic body. The metallic component, the brazing material, and the ceramic body are heated to form the brazed ceramic joint.

In another embodiment, a brazed joint includes a ceramic body having a recess therein. A metallic rod, a mesh, an insert, and a brazing material are disposed within the recess. The rod and the insert further comprise features to reduce the stress concentration within the joint.

In further embodiments, a brazed joint includes a ceramic body having a recess therein. A metallic rod, a mesh, an insert, and a brazing material are disposed within the recess. The rod and the insert further comprise features to reduce the stress concentration within the joint. A conformal layer comprising tungsten, titanium, chromium, or nitrides thereof is disposed within the recess surrounding the rod, the insert, the mesh, and the brazing material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to methods of forming a metallic-ceramic brazed joint. Such metallic-ceramic brazed joints are suitable for use during the fabrication of semiconductor chamber components. The method of forming the brazed joint comprises deoxidizing the surface of metallic components, assembling the joint, heating the joint to fuse the joint components, and cooling the joint. In certain embodiments, the brazed joint includes forming a conformal layer. In further embodiments, the brazed joint includes features shaped to reduce stress concentrations within the joint.

Figure 1:
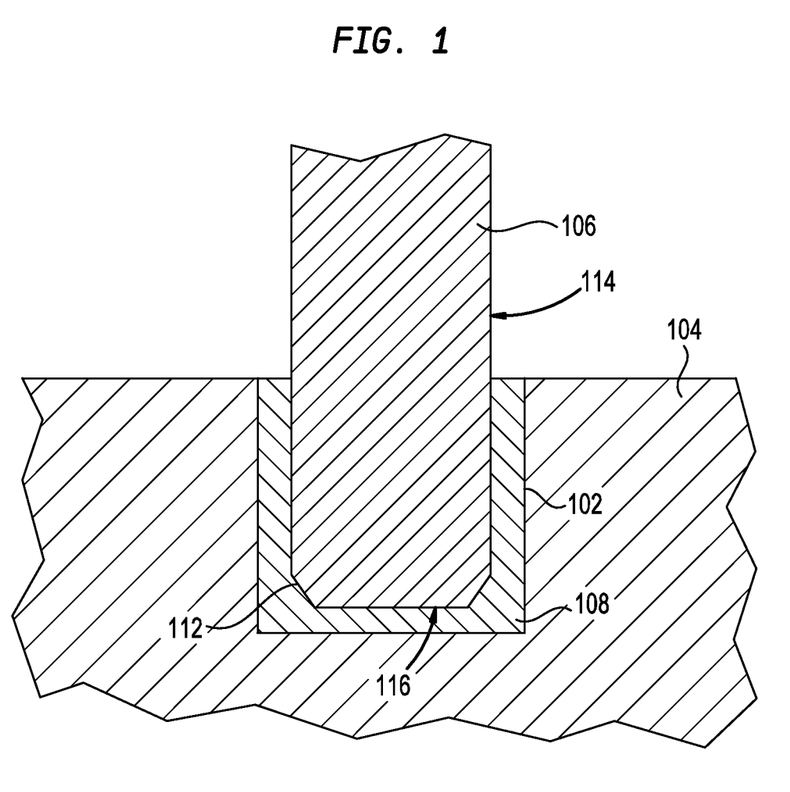
FIG. 1 is a schematic arrangement, in cross-section, of a brazed joint according to one embodiment.

FIG. 1 is a schematic arrangement of an exemplary brazed joint 100. The brazed joint 100 comprises a rod 106 brazed to a ceramic body 104. The ceramic body 104 may be fabricated from any suitable ceramic material such as alumina and aluminum nitride, among others. The rod 106 is fabricated from a metal or a metallic material. For example, the rod 106 may be fabricated from stainless steel, nickel, molybdenum, or titanium, among other suitable materials. The rod 106 is disposed in ceramic body 104. For example, the rod 106 is disposed in a recess 102 formed in the ceramic body 104. In other embodiments, the rod 106 may be disposed in a hole (not shown) through the ceramic body 104 or a cylindrical extension (not shown) disposed on the ceramic body 104. A brazing material 108 is disposed between the rod 106 and the recess 102. The brazing material 108 may be a metal or a metallic material such as gold, titanium, or palladium, among others, or combinations thereof. The brazing material 108 is used to form a fused bond between the rod 106 and the ceramic body 104.

The rod 106 has a cylindrical side surface 114 and a circular bottom surface 116. The bottom surface 116 is generally perpendicular to the cylindrical side surface 114. The rod 106 includes one or more features 112 that join the cylindrical side surface 114 to the bottom surface 116. The feature 112 may be a single or compound chamfer or radius. In the embodiment of FIG. 1, the feature 112 is a chamfer formed between the abutting edges of the cylindrical side surface 114 and the bottom surface 116. In one embodiment, the chamfer may have a linear surface that is angled, for example, in a range of about 30 degrees to about 60 degrees relative to the bottom surface 116. The chamfer may have a length in a range, for example, of 0.10 mm to 1 mm. The chamfer forms a frustoconical feature on the end of the rod 106.

Advantageously, the features 112 prevent certain geometries from creating high stress concentrations within the brazed joint 100. As the brazed joint 100 is thermally cycled, such as repeatedly heated and cooled during semiconductor processing using chamber components having the brazed joint 100, the stress generated within the brazed joint is significantly reduced as compared to conventional brazed joints having right angled structures. Since there is significantly less stress concentrations in the brazed joint 100, the brazed joint is highly resistant to stress induced cracking.

The features 112 may be any shape that reduces the stress concentration within the brazed joint 100. Chamfers are utilized for the features 112 in the embodiment of FIG. 1. Other shapes, such as rounded corners, multiple chamfers, facets, or combinations thereof, may also be utilized for the stress reduction features 112.

Figure 2:
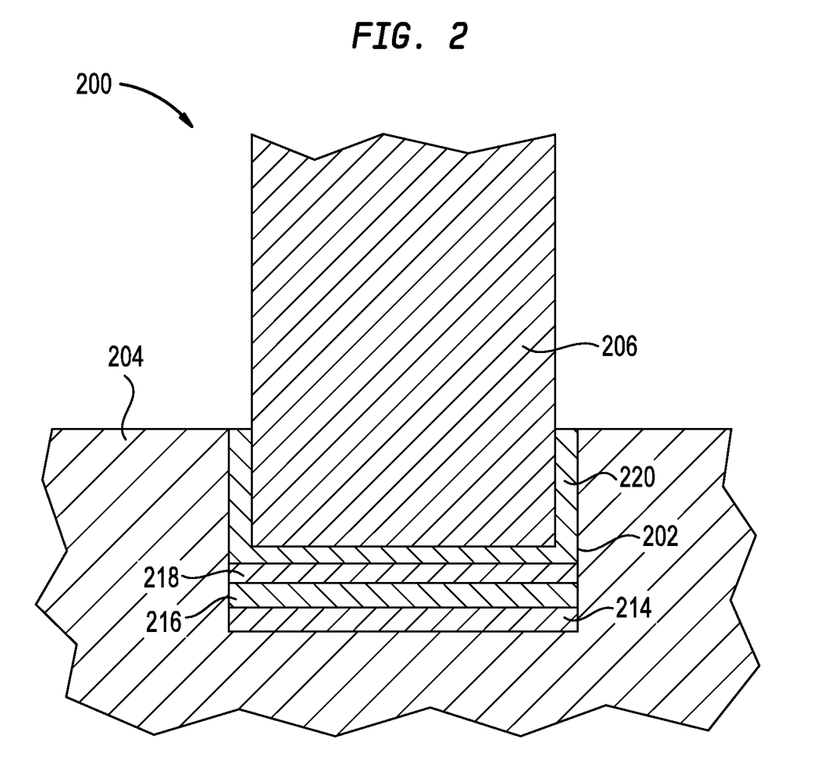
FIG. 2 is a schematic arrangement, in cross-section, of a brazed joint according to one embodiment.

FIG. 2 is a schematic arrangement of an improved brazed joint 200. The brazed joint 200 is like the brazed joint 100 but uses a different arrangement of the brazing material. The brazed joint 200 comprises a rod 206 disposed in a recess 202 formed in a ceramic body 204. The rod 206 may be formed from metal or metallic materials such as nickel, molybdenum, or titanium, among others. The ceramic body 204 may be any suitable ceramic material such as alumina or aluminum nitride. In the embodiment of FIG. 2, the brazed joint 200 is formed using a multilayer construction.

A first layer 214 is disposed within the recess 202. The first layer 214 is formed from a metallic mesh. The metallic mesh may be fabricated from any suitable metal, such as nickel or molybdenum, among others. A second layer 216 is disposed over the first layer 214. The second layer 216 is fabricated from a brazing material. A third layer 218 is disposed over the second layer 216. The third layer 218 is fabricated from a metallic insert. The third layer 218 may be fabricated from any suitable metal, such as nickel or molybdenum, among others. A fourth layer 220 is disposed over the third layer 218. The fourth layer 220 is formed from a brazing material. The third layer 218 advantageously increases the tensile strength of the brazed joint 200 by providing increased surface area and improved bonding between the brazing material and the brazed joint components. Although the rod 206 of FIG. 2 is shown without the features 112 of FIG. 1, it is understood that features 112 may be incorporated into the end of the rod 206.

The second and fourth layers 216, 220 are formed from a brazing material. Upon application of heat during the brazing process, the brazing material solidifies to form a unitary mass of material. The unitary mass bonds the components of the brazed joint 200. The second and fourth layers 216, 220 may be formed of any suitable brazing material selected in relation to the material of the other brazed joint components, such as the rod 206, the first layer 218, the third layer 220, and the ceramic body 204. In one example, the second and fourth layers 216, 220 may be fabricated from one or more of the brazing materials including gold, titanium, and palladium. In certain embodiments, the second and fourth layers 216, 220 comprise sheets of brazing material. The sheets may be foils of a metal or a sheet of powdered metal held in place by a binder. The sheets of brazing material may have a thickness, for example, about 50 microns to about 250 microns. Sheets of brazing material greatly reduce the occurrence of oxidation within the brazed joint 200. The second and fourth layers 216, 220 may be in other forms, such as paste, powder, or flowable metal. Other materials suitable for use as the second and fourth layers 216, 220 include silver, copper, tungsten, cobalt, chromium, and iron, or combinations thereof. The second and fourth layers 216, 220 may be combination of materials. In certain embodiments, the second and fourth layers 216, 220 comprise approximately 90% palladium. In further embodiments, the second and fourth layers 216, 220 comprise approximately 30% copper, 60% gold, and 10% nickel. In still further embodiments, the second and fourth layers 216, 220 comprise approximately 80% gold and 20% nickel. In yet further embodiments, the second and fourth layers 216, 220 comprise approximately 60% palladium and 40% cobalt. Any suitable combination of materials for the second and fourth layers 216, 220 can be selected to achieve desired brazed joint properties, such as tensile strength, corrosion resistance, or heat conductivity.

Figure 3A:
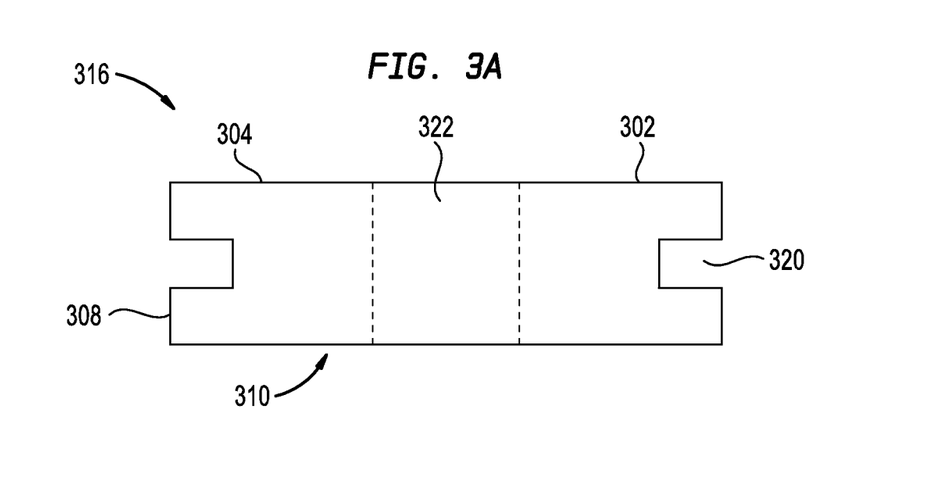
FIGS. 3A-3B are schematic elevations of components used within a brazed joint according to one embodiment.

FIG. 3A and FIG. 3B are exemplary components for a brazed joint. FIG. 3A is an illustrative example of a metallic insert 316. The metallic insert 316 may be used in place of the metallic insert 216 of FIG. 2. The metallic insert 316 comprises a circular body 302 having an upper surface 304 and a lower surface 310. An outer surface 308 extends between and connects the upper surface 304 and the lower surface 310. The metallic insert 316 of FIG. 3 includes one or more expansion features. A first expansion feature is an annular channel 320 disposed within the outer surface 308. The channel 320 extends partially into, and circumscribes, the body 302. A second expansion feature is an aperture 322 (indicated in phantom) extending through the center of the body 302 between the upper surface 304 and the lower surface 310. The purpose of the expansion features are further discussed below.

Figure 3B:
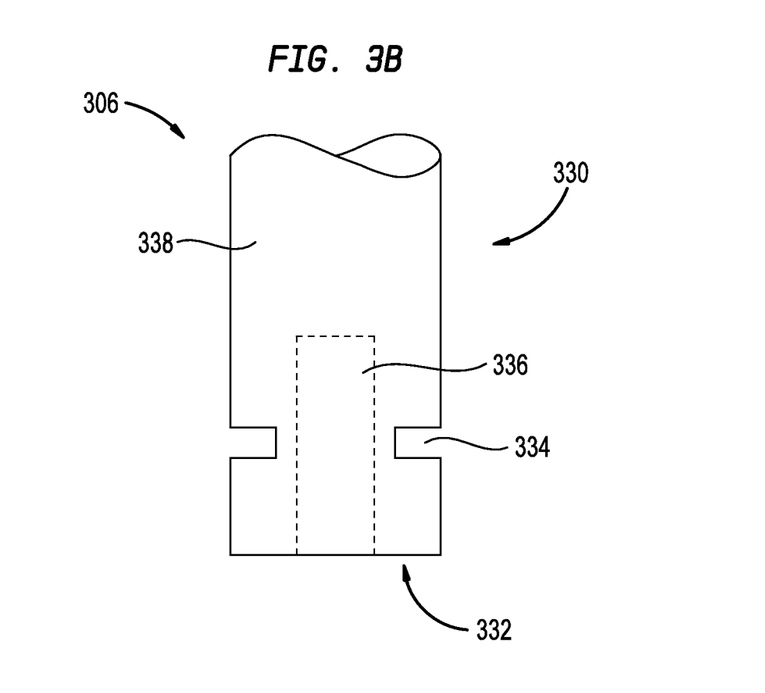

FIG. 3B is an illustrative example of a rod 306. The rod 306 may be used in place of the rod 206 of FIG. 2. The rod 206 has a cylindrical outer surface 330 and a circular lower surface 332 partially defining a body 338. The rod 306 also has expansion features. A first expansion feature is an annular channel 334 disposed within the outer surface 330 in the body 338. The channel 334 extends partially into, and circumscribes, the body 338. A second expansion feature is a bore 336 (indicated in phantom). The bore 336 extends partially inward to the body 338 along a centerline from the lower surface 332 to define a recess therein.

The expansion features, such as the channels 320, 334, aperture 322, and bore 336 provide volumes into which the materials forming the brazed joint may expand. When the brazed joint is heated to high temperatures during fabrication of the joint or during semiconductor processing operations, the materials within the brazed joint thermally expand. In conventional brazed joints, the expansion may be constrained by the geometry of the brazed joint, such as by the smooth bore of the recess and smooth cylindrical surface of the rod. When the materials become constrained, stress increases as the brazed joint continues to expand. This stress may exceed the material properties and thereby form cracks within the joint. The expansion features described herein allow for the materials of the brazed joint to expand without becoming constrained. That is, the volumes created by channels 320, 334, aperture 322, and bore 336 provide an area for the materials comprising the brazed joint to expand and flow into without inducing excess stress within the joint. The size and geometry of the expansion features are selected in relation to the design of the brazed joint and the expected thermal expansion thereof during fabrication and use. It is understood that various arrangements of expansion volumes may be utilized. Further, it is not necessary to utilize each of the channels 320, 334, aperture 322, and bore 336 within the same joint. Any expansion features, such as the channels 320, 334, aperture 322, and bore 336, may be practiced singularly or in conjunction with any one or more of the other features.

Figure 4:
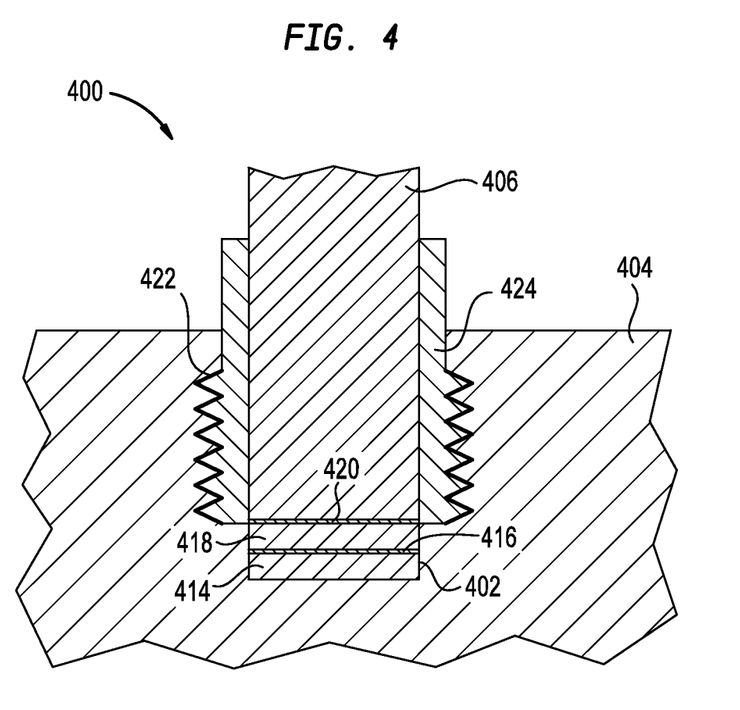
FIG. 4 is a schematic arrangement, in cross-section, of a brazed joint according to one embodiment.

FIG. 4 is a schematic arrangement of an exemplary brazed joint 400. The brazed joint 400 is like the brazed joint 200 but additionally uses a sleeve. The brazed joint 400 includes a rod 406 inserted into a recess 402 formed in a ceramic body 404. The rod 406 may be formed from metal or metallic materials such as nickel, molybdenum, or titanium, among others. The ceramic body 404 may be any suitable ceramic material such as alumina or aluminum nitride. A multilayer brazing construction is disposed within the recess 402. A first layer 414 is formed from a metallic mesh. The metallic mesh may be fabricated from any suitable metal, such as nickel or molybdenum, among others. A second layer 416 is formed over first layer 414. The second layer 416 is formed from a brazing material. A third layer 418 is disposed over the second layer 416. The third layer 418 is formed from a metallic insert. The third layer 418 may be fabricated from any suitable metal, such as nickel or molybdenum, among others. The material of the second and fourth layers 416, 420 are the same materials as the second and fourth layers 216, 220 of FIG. 2. A threaded sleeve 424 is disposed within the recess 402. The threaded sleeve 424 is formed from a metal or a metallic material such as nickel, molybdenum, or titanium, among others. In certain embodiments, the threaded sleeve 424 and the rod 406 are formed from the same materials. The threaded sleeve 424 mates to a threaded portion of the recess 402. The threaded sleeve 424 provides a secure connection between the rod 406 and the recess 402 by increasing the surface area of the joint. A brazing material 422 is optionally disposed between the threaded sleeve 424 and the threaded portion of the recess 402. Here, the brazing material 422 may be formed from the same materials as the second and fourth layers 416, 420. In certain embodiments, the rod 406 and the threaded sleeve 424 are a unitary body. In further embodiments, the threaded sleeve 424 may be coupled to the rod 406 by welding or bonding.

Figure 5:
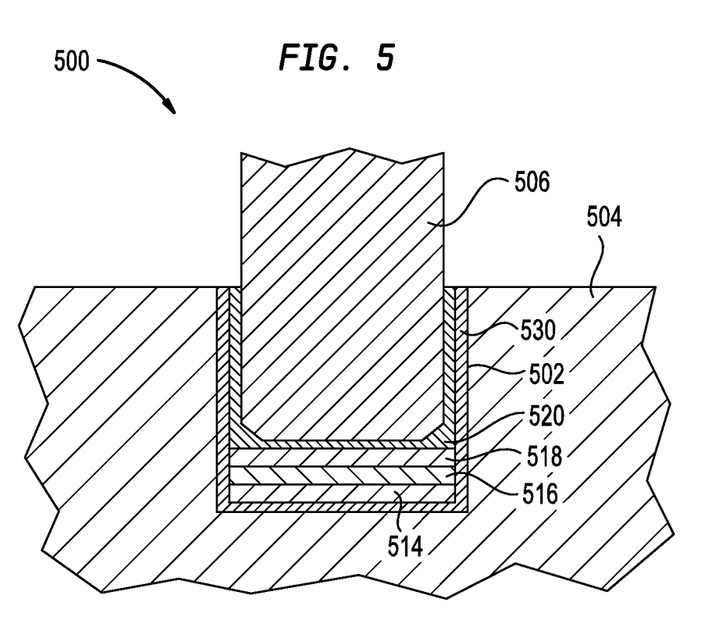
FIG. 5 is a schematic arrangement, in cross-section, of a brazed joint according to one embodiment.

FIG. 5 is a schematic illustration of a brazed joint 500. The brazed joint 500 is like brazed joint 200 but additionally includes a conformal layer. The brazed joint 500 includes a rod 506 disposed in a recess 502 formed within a ceramic body 504. The rod 506 may be formed from metal or metallic materials such as nickel, molybdenum, or titanium, among others. The ceramic body 504 may be any suitable ceramic material such as alumina or aluminum nitride. A conformal layer 530 is formed on the recess 502. The conformal layer 530 is generally formed by a sputter process but any suitable deposition process may be utilized. The conformal layer 530 is formed from tungsten, titanium, chromium, or nitrides thereof. The conformal layer 530 may be formed from a single layer of single material or from multiple layers wherein each layer is formed from a different material. The recess 502 may have a roughened surface, for example, having a roughness average (Ra) in a range of about 5 microns to about 40 microns, to enhance bonding of the recess 502 with the conformal layer 530. The materials of the conformal layer 530 are selected in relation to the material and surface finish of the ceramic body 504 (i.e., roughness of the recess 502). The conformal layer 530 increases the strength of the brazed joint 500 by providing a surface that readily fuses with material of brazing material layers of the second and fourth layers 516, 520. In certain embodiments, the conformal layer 530 includes a layer formed from chromium, a layer formed from titanium, and a layer formed from tungsten. In one embodiment, the conformal layer 530 is a layer of tungsten formed over a layer of titanium which is formed over a layer of chromium. In another embodiment, the conformal layer 530 is a layer of titanium formed over a layer of tungsten which is formed over a layer of chromium. In still further embodiments, the conformal layer 530 completely covers the internal surfaces of the recess 502.

A first layer 514 is disposed within the recess 502 inwardly of the conformal layer 530. The first layer 514 is fabricated from a metallic mesh. The metallic mesh may be fabricated from any suitable metal, such as nickel or molybdenum, among others. A second layer 516 is disposed over the first layer 514. The second layer 516 is fabricated from a brazing material. A third layer 518 is disposed over the second layer 516. The third layer 518 is fabricated from a metallic insert. The third layer 518 may be fabricated from any suitable metal, such as nickel or molybdenum, among others. A fourth layer 520 is disposed over the third layer 518 and further between the rod 506 and the conformal layer 530. The fourth layer 520 is formed from a brazing material. The materials of the second and fourth layers 516, 520 are identical to those used in second and fourth layers 216, 220 of FIG. 2.

Figure 6:
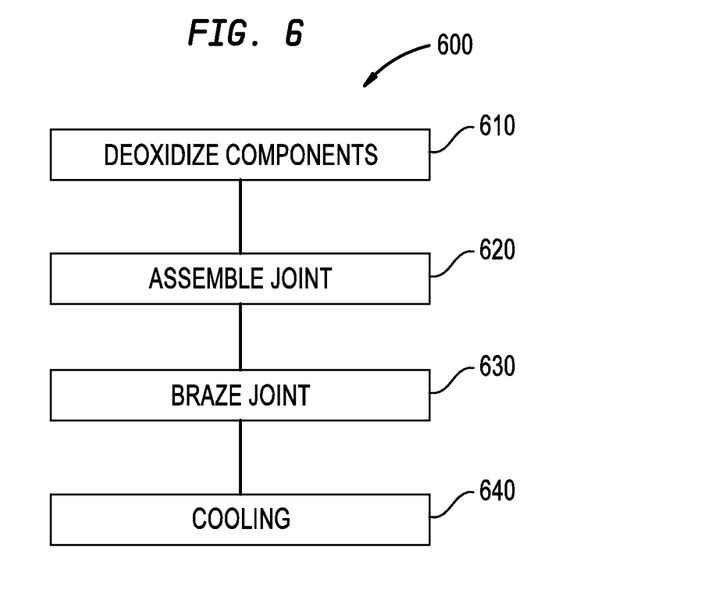
FIG. 6 is a flow diagram of a method of forming a brazed joint according to one embodiment.

FIG. 6 is a flow diagram of a method for creating a brazed joint, such as brazed joint 200. The method 600 is optionally performed in a deoxygenized atmosphere to prevent oxidation of the joint. The method 600 begins by deoxidizing the surface of all metallic components at step 610 to substantially prevent porosity within the brazed joint. At step 620, the components of the brazed joint are assembled, such as disposing the layers 212, 214, 216, 220 within the recess 202. At step 630, the brazed components are heated to a high temperature, such as about 450 degrees Celsius, to fuse the brazed joint. The brazed joint may be heated using any suitable method, such as resistive heating or heating in a furnace. During the heating at step 630, a force is applied to a component of the brazed joint component, such as rod 206 or body 204. The force applied to the joint component may be continuously applied during heating of the joint to reduce the introduction of excess stress in the joint. The force may be in a range, for example, from about 5 kilogram-force (kgf) to about 90 kgf, and is selected in relation to the brazing temperature and materials of the brazed joint. The force may be modulated to maintain a constant stress within the brazed joint. After the brazing is complete in step 630, the joint is cooled in step 640. The rate and method of cooling the brazed joint may be selected reduce the introduction of excess stress into the joint. For example, the brazed joint may be cooled by ambient cooling or controlled quenching. The method of cooling and the cooling rate is again selected in relation to the brazing temperature and the materials of the brazed joint.

Figure 7:
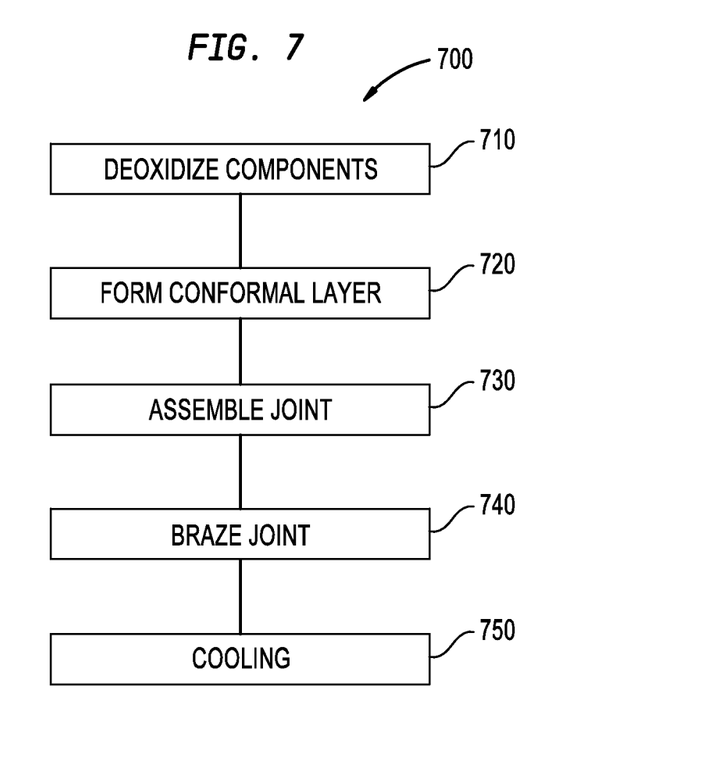
FIG. 7 is a flow diagram of a method of forming a brazed joint according to one embodiment.

FIG. 7 is a flow diagram of a method for creating a brazed joint, such as brazed joint 500. Like the method 600 of FIG. 6, the method 700 of FIG. 7 is optionally performed in a deoxygenized atmosphere to prevent oxidation of the joint. The method 700 begins at step 710 where the surfaces of the metallic components are deoxidized to substantially prevent porosity in the brazed joint. Next at step 720, a conformal layer, such as conformal layer 530 of FIG. 5, is formed within the joint. The conformal layer may be formed from tungsten, titanium, or chromium, or nitrides thereof in a single layer or in multiple layers by any suitable means. At step 730, the joint is assembled, such as disposing layers 514, 516, 518, and 520 within the recess 502. The joint is then heated at step 740 to fuse the brazed joint. After heating in step 740, the brazed joint is cooled in a manner to prevent inducing excess stress therein at step 750. For example, the brazed joint may be cooled by ambient cooling or controlled quenching.

Similar to the method 600 of FIG. 6, the brazed joint is heated at step 740. The brazed joint may be heated by any suitable method, such as resistive heating or furnace heating. During the heating at step 740, a force is applied to a component of the brazed joint, such as rod 506 or the body 504. The force applied to the component may be applied continuously during the heating of the joint in order to reduce the introduction of excess stress in the joint. The force may be in a range, for example, from about 5 kgf to about 90 kgf, and is selected in relation to the brazing temperature and materials of the brazed joint. In order to control the force applied to the component of the brazed joint, the force may be measured using a sensor such as a load sensor. Further, the force may be modulated to maintain a constant stress within the joint.

Figure 8:
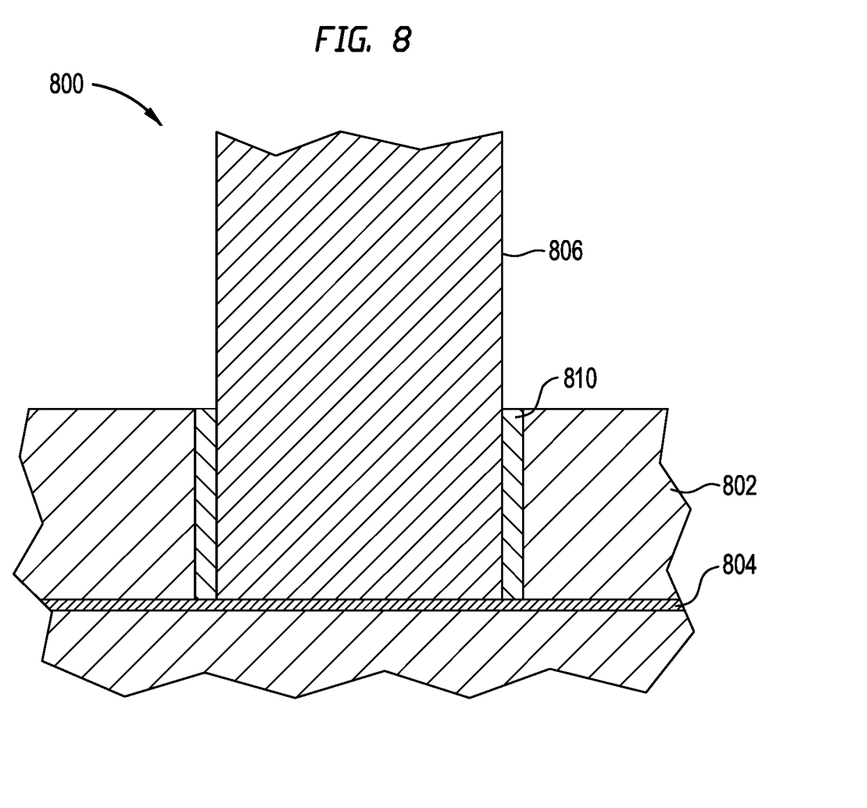
FIG. 8 is an enlarged portion of a brazed joint, according to one embodiment.

FIG. 8 is an enlarged portion of a brazed joint 800. Here, the brazed joint 800 is formed in a ceramic body 802 with a grounding connection 806 coupled to the mesh 804. Here, the grounding connection 806 is represented as a rectangle. However, the grounding connection 806 can be made from various designs. In one example, the grounding connection 806 is a metal component that is brazed (indicated by 810) to the mesh 804 and the ceramic body 802. In another example, the grounding connection 806 is a threaded component which contacts the mesh 804. The grounding connection 806 may be internally threaded (i.e., female with a stud in the ceramic body 802) or externally threaded (i.e., male) which mates to a complimentary threaded portion of a recess formed in the ceramic body 802. The threads of the grounding connection 806 may be, for example, #6-32 UNC. Alternatively, the threads may be between M2 and M10 metric thread. In yet another example, the grounding connection 806 is coated. For example, the grounding connection 806 is coated with a plating of gold or silver. The coating can be made from a single layer or multiple layers. In yet another example, the grounding connection 806 is a multi-pin connector or a spring-type connector.

While the foregoing is directed to embodiments of the present disclosure, other and further embodiments of the disclosure may be devised without departing from the basic scope thereof, and the scope thereof is determined by the claims that follow.

What is claimed is:

1. A metallic-ceramic brazed joint for substrate processing components, comprising:
   a ceramic body having a recess therein;
   a conformal layer disposed on the recess;
   a rod having a portion disposed within the recess;
   a first layer comprising a mesh disposed within the recess;
   a second layer comprising a brazing material disposed proximate to the first layer;
   a third layer comprising an insert disposed proximate to the second layer; and
   a fourth layer comprising a brazing material disposed proximate to the third layer.

2. The joint of claim 1, further comprising a grounding connection coupled to the mesh.

3. The joint of claim 1, wherein the brazing material comprises gold, titanium, palladium, silver, copper, tungsten, cobalt, chromium, iron, or combinations thereof.

4. The joint of claim 1, wherein the rod comprises a body having at least one stress reduction feature.

5. The joint of claim 4, wherein the at least one stress reduction feature comprises a chamfer, a rounded corner, a channel, a recess, or combinations thereof.

6. The joint of claim 1, wherein the insert comprises:
   a body having at least one expansion feature formed therein.

7. The joint of claim 1, wherein the conformal layer comprises tungsten, titanium, chromium, or combinations thereof.

8. A metallic-ceramic brazed joint for substrate processing components, comprising:
   a ceramic body having a recess therein;
   a conformal layer disposed on the recess;
   a rod having a portion disposed within the recess;
   a sleeve surrounding a portion of the rod;
   a first layer comprising a mesh disposed within the recess;
   a second layer comprising a brazing material disposed proximate to the first layer;
   a third layer comprising an insert disposed proximate to the second layer; and
   a fourth layer comprising a brazing material disposed proximate to the third layer.

9. The joint of claim 8, further comprising a grounding connection coupled to the mesh.

10. The joint of claim 8, wherein the brazing material comprises gold, titanium, palladium, silver, copper, tungsten, cobalt, chromium, iron, or combinations thereof.

11. The joint of claim 8, wherein the conformal layer comprises tungsten, titanium, chromium, or combinations thereof.

12. The joint of claim 11, wherein the conformal layer comprises more than one layer.

13. The joint of claim 8, wherein the conformal layer completely covers an internal surface of the recess.

14. The joint of claim 8, wherein the rod comprises a body having at least one stress reduction feature disposed therein, wherein the at least one stress reduction feature comprises a chamfer, a rounded corner, a channel, a recess, or combinations thereof.

15. The joint of claim 8, wherein the insert comprises a body having at least one expansion feature disposed therein, the at least one expansion feature comprising a channel, an aperture, or combinations thereof.

\* \* \* \* \*